(12) United States Patent
Moore et al.

(10) Patent No.: US 7,611,006 B2
(45) Date of Patent: Nov. 3, 2009

(54) CONVEYOR SYSTEMS AND METHODS (75) Inventors: John D. Moore, Batavia, OH (US);
Brian D. Hysell, West Chester, OH (US)

(73) Assignee: FKI Logistex, Inc., Cincinnati, OH (US)

( * ) Notice: Subject to any disclaimer, the term of this patent is extended or adjusted under 35 U.S.C. 154(b) by 0 days.

(21) Appl. No.: 11/888,153

(22) Filed: Jul. 31, 2007

(65) Prior Publication Data

US 2008/0023294 A1 Jan. 31, 2008

Related U.S. Application Data

(60) Provisional application No. 60/834,387, filed on Jul. 31, 2006.

(51) Int. Cl.
*B65G 47/10* (2006.01)
(52) U.S. Cl. .................. 198/370.02; 198/890
(58) Field of Classification Search ............ 198/370.02, 198/890, 890.1
See application file for complete search history.

(56) References Cited

U.S. PATENT DOCUMENTS

| | | | |
|---|---|---|---|
| 3,361,247 A | 1/1968 | Lauzon et al. | |
| 4,717,011 A * | 1/1988 | Yu et al. ................ | 198/370.02 |
| 4,738,347 A | 4/1988 | Brouwer et al. | |
| 5,038,912 A | 8/1991 | Cotter | |
| 5,127,510 A | 7/1992 | Cotter et al. | |
| 5,165,515 A | 11/1992 | Nitschke et al. | |
| 5,191,959 A | 3/1993 | Leemkuil | |
| 5,333,715 A | 8/1994 | Sapp | |
| 5,427,223 A | 6/1995 | van den Goor | |
| 5,613,591 A * | 3/1997 | Heit et al. ............... | 198/370.02 |
| 5,927,465 A | 7/1999 | Shearer, Jr. | |
| 5,967,289 A | 10/1999 | Kelsey | |
| 6,041,909 A | 3/2000 | Shearer, Jr. | |
| 6,390,274 B1 | 5/2002 | Snedecor | |

(Continued)

FOREIGN PATENT DOCUMENTS

JP          569937          3/1993

(Continued)

OTHER PUBLICATIONS

International Search Report for corresponding application PCT/US2007/017059 dated Aug. 25, 2008.

*Primary Examiner*—Douglas A Hess
(74) *Attorney, Agent, or Firm*—Frost Brown Todd LLC (57) ABSTRACT

Embodiments are directed to conveyor systems and methods which can accommodate negative gap between articles (e.g., cartons, packages, products, etc.) conveyed upon a sortation conveyor. Negative gap is attained by placing articles side-by-side upon a conveyor (as opposed to single file) so that the trailing edge of a leading article can lag behind the leading edge of a trailing article in the movement direction. In one embodiment, a conveyor system comprises a main conveying line providing a conveying surface configured to carry articles, a plurality of pusher elements associated with the main conveying line, a controller configured to assign pusher elements to articles being conveyed and to determine whether two articles received can be placed next to one or more of the same pusher elements in an overlapping relationship, can be placed to receive contact from immediately adjacent pusher elements, or should be spaced by one or more pusher elements.

14 Claims, 7 Drawing Sheets

U.S. PATENT DOCUMENTS

| | | | |
|---|---|---|---|
| 6,419,073 B1 | 7/2002 | Piron | |
| 6,513,642 B1 | 2/2003 | Shearer, Jr. | |
| 6,522,943 B2 * | 2/2003 | Dierauer | 700/223 |
| 6,786,328 B2 * | 9/2004 | Honegger | 198/890.1 |
| 6,854,584 B2 | 2/2005 | Henson et al. | |
| 6,860,376 B1 | 3/2005 | Heit et al. | |
| 6,866,136 B2 | 3/2005 | Veit et al. | |
| 6,889,822 B1 | 5/2005 | Wagner et al. | |
| 6,951,274 B2 | 10/2005 | Zeitler et al. | |
| 7,017,730 B2 * | 3/2006 | Mills et al. | 198/368 |
| 7,055,669 B2 | 6/2006 | Veit | |
| 7,086,519 B2 | 8/2006 | Veit et al. | |
| 7,117,988 B2 | 10/2006 | Veit et al. | |
| 7,198,145 B1 | 4/2007 | Brown et al. | |
| 7,240,781 B2 | 7/2007 | Ramaker et al. | |
| 7,284,652 B2 | 10/2007 | Zeitler et al. | |
| 7,357,242 B2 * | 4/2008 | Enomoto | 198/370.02 |
| 2002/0096417 A1 | 7/2002 | Veit et al. | |
| 2004/0222070 A1 | 11/2004 | Neiser et al. | |
| 2005/0000779 A1 | 1/2005 | Neiser et al. | |
| 2005/0284730 A1 | 12/2005 | Heit et al. | |
| 2006/0060447 A1 | 3/2006 | Ramaker et al. | |
| 2006/0076216 A1 | 4/2006 | Wagner et al. | |
| 2006/0207858 A1 | 9/2006 | Veit | |
| 2007/0007108 A1 | 1/2007 | Veit et al. | |
| 2007/0205083 A1 | 9/2007 | Smalley et al. | |
| 2007/0209906 A1 | 9/2007 | Ranger et al. | |
| 2007/0215436 A1 | 9/2007 | Enomoto | |
| 2007/0289839 A1 | 12/2007 | Zimmer | |

FOREIGN PATENT DOCUMENTS

| | | |
|---|---|---|
| JP | 11157643 | 6/1999 |
| JP | 2006273469 | 10/2005 |

* cited by examiner

CONVEYOR SYSTEMS AND METHODS

CROSS REFERENCE TO RELATED APPLICATION

This application claims the benefit of U.S. Provisional Application No. 60/834,387, filed Jul. 31, 2006, the entire disclosure of which is hereby incorporated herein by reference.

TECHNICAL FIELD

The present invention relates to conveyor systems and methods.

BACKGROUND

In conveyor systems for conveying and distributing articles, a series of conveyed articles are typically transported along moving conveying surfaces. Conventional conveyor systems often include one or more sortation conveyors which divert selected articles from a primary conveying path onto one or more secondary conveying paths.

Sortation conveyors often employ pusher elements which are mounted relative to the conveying surface. Often, the pusher elements are mounted such that they may be selectively moved across the conveying surface in order to eject an article from the primary conveying path and onto a secondary conveying path. One particular sortation conveyor of this type is referred to as a "shoe sorter," wherein the pusher elements are termed "divert shoes."

In a typical conventional shoe sorter, the primary conveying surface is provided by multiple transverse tubes (rollers) or slats which form the conveying surface. Multiple pusher elements are part of or supported by the conveying surface and are guided in a set position along the length of the sorter during normal forward operation. The pusher elements can take on many forms such as belted slats, pins, and molded blocks. Historically, the most prevalent design is referred to as a shoe, although other designs are possible. Here after the term shoe and pusher element shall be used to include all conventional shoes, as well as other diverting elements such as but not limited to slats, belts, rollers, etc. To direct an article from the primary conveying path onto a secondary conveying path, a switch mechanism can be engaged to cause an assigned set of pusher elements to slide across the conveying surface in a diagonal direction. The diverted pusher elements engage and divert the article to the secondary conveying path. Such shoe sorters often use guide tracks or guide surfaces which direct the assigned set of shoes laterally across the conveying surface, while shoes which are not assigned continue to travel along the conveying surface in their set position In conventional sortation conveyors, a control system ensures that the appropriate set of pusher elements is assigned to each article, and that the assigned pusher elements are directed across the primary conveying surface at the proper time (i.e., when an article needs to be directed or pushed to a secondary conveying path rather than remain on the primary conveying path). Sorter throughput depends on a variety of factors, particularly the speed of the conveying surface and the size of the gap between adjacent articles being sorted. Higher throughput means that more articles can be handled faster and that handling costs can be reduced (e.g., because fewer distribution facilities may be required, less man-hours may be required to operate machinery, etc.). If the size of the gap is small, it can be difficult for the control system to not only assign the proper set of pusher elements, but also ensure that the assigned set of pusher elements are diverted across the conveying surface at the proper time. However, increasing the speed can introduce other problems such as increased maintenance and decreased controllability. Accordingly, it is desired to provide methods and systems that increase conveyor throughput for a given conveyor speed, while maintaining adequate sortation accuracy and timing.

SUMMARY

In accordance with one embodiment of the present invention, a conveyor system is provided for selectively diverting articles from a primary conveying surface onto one of a plurality of branch lines. The conveyor system includes a sortation conveyor which comprises a driven primary conveying surface for supporting and transporting articles thereon, one or more branch lines extending away from the primary conveying surface, a plurality of pusher elements, and means for diverting said pusher elements across said primary conveying surface. The pusher elements are mounted for movement with the primary conveying surface for selective movement across the primary conveying surface so as to selectively divert articles onto the branch lines. The conveyor system includes a control system which is configured for selectively operating the means for diverting. The control system is configured to assign two or more of the pusher elements to the article to be diverted, and to selectively operate the means for diverting when the assigned pusher elements are located adjacent a predetermined branch line for the article to which the pusher elements are assigned. The control system is configured to facilitate provision of adjacent articles in an overlapping configuration upon the primary conveying surface and to ensure proper diversion of articles from the primary conveying surface to any of a plurality of secondary paths that happen to be assigned to the articles.

In accordance with another embodiment of the present invention, a method for efficiently conveying articles comprises receiving an article, measuring the length of the article, and determining the destination of the article. Based upon the length and destination, it is automatically determined whether the article should overlap with a preceding article received. If it is determined that the article can overlap with the preceding article, the article is automatically placed on a sortation conveyor on one side of the sortation conveyor adjacent a second side of the sortation conveyor containing the preceding article and overlapping the preceding article such that a portion or all of the article is located along the side of a portion or all of the preceding article.

In accordance with yet another embodiment of the present invention, a method for assigning shoes to articles on a sorting conveyor comprises receiving the length of an article to be conveyed and receiving the destination of the article. Based upon the destination and length of the article and the destination and length of a preceding article, it is automatically determined whether the article should be assigned pusher elements that will be adjacent the side of the preceding article, or whether the article should be assigned pusher elements that will be upstream from the preceding article with no additional pusher elements between the article and the preceding article, or whether the article should be assigned pusher elements that will be upstream from the preceding article with at least one additional pusher element located between the article and the preceding article.

In accordance with still another embodiment of the present invention, a method for assigning shoes to articles on a sorting conveyor further comprises placing the article and the preceding article on a sortation conveyor along opposing sides of the sortation conveyor based upon the determination, wherein the articles either overlap, are longitudinally adjacent, or are longitudinally spaced based upon the determination.

In accordance with another embodiment of the present invention, a conveyor system comprises a main conveying line providing a conveying surface configured to carry articles, a plurality of pusher elements associated with the main conveying line, a controller configured to assign pusher elements to articles being conveyed and to determine whether two articles received can be placed next to one or more of the same pusher elements in an overlapping relationship, can be placed to receive contact from immediately adjacent pusher elements, or should be spaced by one or more pusher elements.

In accordance with still another embodiment of the present invention, a conveyor system includes a controller which is configured to make the determination based upon the length of the articles and the destinations for the articles.

In accordance with still another embodiment of the present invention, a conveyor system further comprises an article placement mechanism configured to place the two articles on the conveying surface according to the determination of the controller.

In accordance with still another embodiment of the present invention, a conveyor system further comprises a track for guiding the pusher elements and a switch configured to change the track to facilitate movement of the pusher elements to divert the article. A controller can be configured to control the switch when it is desired to divert the article.

BRIEF DESCRIPTION OF THE DRAWINGS

The following detailed description will be more fully understood in view of the drawings in which.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION OF ILLUSTRATIVE EMBODIMENTS

Embodiments are directed to conveyor systems and methods which depart from conventional single-file conveyance of articles, and which can accommodate negative gap between articles (e.g., cartons, packages, products, etc.) conveyed upon a sortation conveyor. Negative gap is attained by placing articles side-by-side upon a conveyor (as opposed to single file) so that the trailing edge of a leading article can lag behind the leading edge of a trailing article in the movement direction. By providing negative gap between articles, article throughput on a sortation conveyor may be increased for a given conveying speed.

Figure 1:
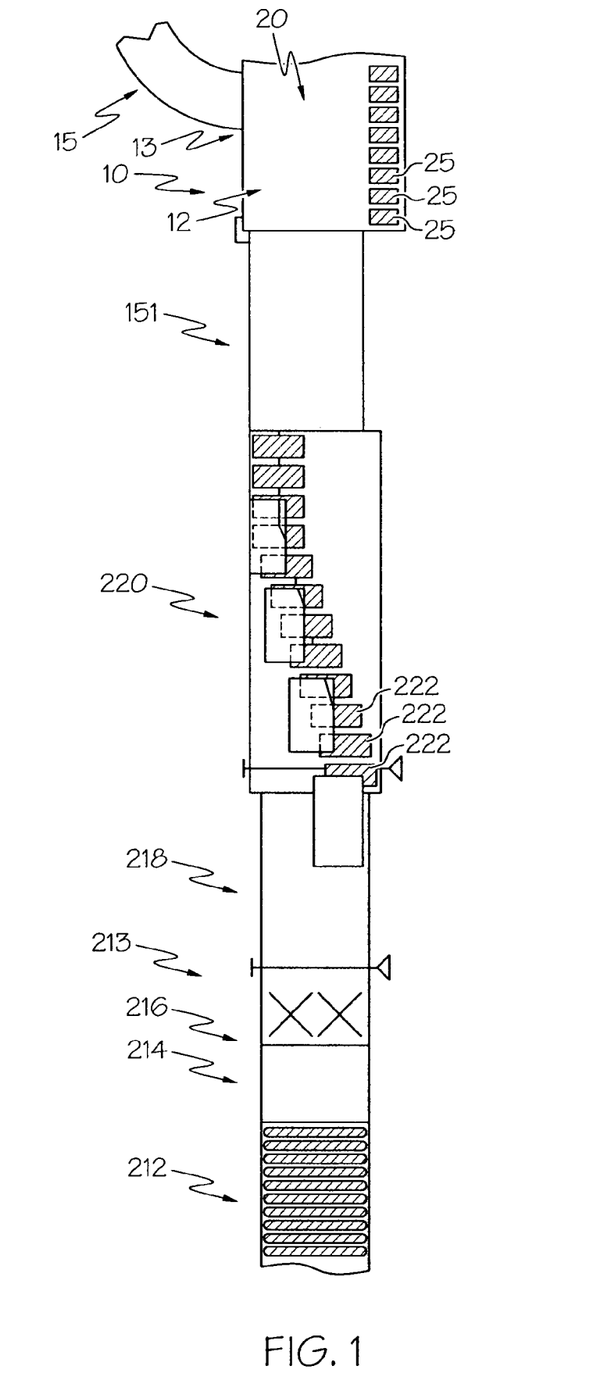
FIG. 1 is a schematic top plan view depicting a conveyor system in accordance with one embodiment of the present invention.

A conveyor system in accordance with one embodiment of the present invention can include, in addition to a sortation conveyor, one or more additional conveyor components provided upstream and/or downstream of the sortation conveyor. Additional components located upstream of the sortation conveyor can receive and position articles for passage along to the sortation conveyor in a predetermined manner, as discussed in further detail below. For example, as shown in FIG. 1, a conveyor system includes an induction conveyor 212 which receives and delivers a series of articles for eventual passage to a sortation conveyor 10. The induction conveyor 212 can include rollers, belts, and/or any of a variety of other devices or mechanisms operative to facilitate conveyance of articles.

The induction conveyor 212 is configured to dispense articles onto a first endless belt 214 of a gap optimizer 213. The articles can arrive onto the first endless belt 214 in a generally straight line, all aligned against one side (e.g., the right side), and with a small gap between the articles. The articles then travel from the first endless belt 214 to a second endless belt 218 of the gap optimizer 213 by crossing an interface 216. The endless belts 214 and 218 are driven by a common motor, but are driven at different gear reductions so that the second endless belt 218 runs faster than the first endless belt 214. As a result of this speed difference, the length of the gap between adjacent articles is changed when the articles pass over the interface 216. By adjusting the speed of the motor, it will be appreciated that the length of the gap provided between adjacent articles can be variably adjusted. The speed of the motor can be adjusted on an article-by-article basis by a controller (e.g., 160 shown in FIG. 3) in order that the gap between any two adjacent articles can be optimally provided. The motor can comprise a servo motor, induction motor, or other type of motor, and can operate in an open or closed loop control arrangement (e.g., with or without an encoder). It will be appreciated that a conveyor system in accordance with the teachings of the present invention can include a gap optimizer having any of a variety of alternative configurations.

Upon leaving the second endless belt 218 of the gap optimizer 213, the articles progress onto a shift conveyor 220. During use, the shift conveyor 220 moves at a constant speed. In one embodiment, the shift conveyor 220 can be driven by a motor under control of a variable speed motor controller. In some circumstances, the motor controller might receive and follow a speed setpoint from the sortation conveyor 10. Because the shift conveyor 220 typically has a speed different than the second endless belt 218, the gap between adjacent articles will change (e.g., be increased) once the articles move from the second endless belt 218 and onto the shift conveyor 220. In one embodiment of the present invention, each of the articles is justified on one side (e.g., to the right side) upon entrance to the shift conveyor 220. However, the shift conveyor 220 includes sliding elements (e.g., 222) upon which the entering articles rest. Selected articles are moved by the sliding elements (e.g., 222) to the other side (e.g., the left side) of the shift conveyor 220, while the remaining articles remain as initially justified (e.g., on the right side). The shift conveyor 220 can be provided in any of a variety of alternative configurations. In one particular embodiment of the present invention, the shift conveyor 220 can be configured similarly to the sortation conveyor 10 described below, except that its sliding elements (e.g., 222) can be substantially flat so as to effectively underlie an article (as opposed to the pusher elements 25 of the sortation conveyor 10 which have a vertically-oriented pushing face). Of course, the sliding shoes of a shift conveyor in accordance one embodiment of the present invention can have any of a variety of shapes and configurations which are suitable to facilitate selective movement of the sliding shoes and selected articles, and other mechanisms can be used to shift articles from one side of the conveyor to the other.

In operation, some articles leave the shift conveyor 220 justified to one side (e.g., the right side), while other articles leave justified to the other side (e.g., the left side), thereby resulting in two rows of articles leaving the shift conveyor 220. These two rows of articles then move onto another induction conveyor 151. The induction conveyor 151 also operates at a constant speed, which is typically slower than the constant speed of the shift conveyor 220. As a result, in such a configuration, the gap between adjacent articles can lessen in the movement (conveying) direction when the articles move from the shift conveyor 220 to the induction conveyor 151. The gap between adjacent articles thereby can be reduced to a distance shorter than a single pusher element, and can even be negative (i.e., when articles on the left and right sides of the apron overlap).

The articles then move from the induction conveyor 151 onto the sortation conveyor 10. The sortation conveyor 10 operates at a constant speed. The speed of the sortation conveyor 10 might be the same as or less than the speed of the induction conveyor 151. Accordingly, by the time the articles enter the sortation conveyor 10, the articles are relatively closely spaced (and can even overlap), and resultantly occupy the sortation conveyor in a relatively dense configuration (e.g., see FIG. 6).

The sortation conveyor 10 includes a main conveying line 12 along which articles are transported in a forward direction. The primary conveying surface or apron 20 of the main conveying line 12 may be provided by tubes (rollers) or slats extending transverse to the direction of travel of articles moving on the apron 20. Of course, other types of aprons may be employed. The sortation conveyor 10 provides selective diversion of the articles as desired onto branch conveying lines (e.g., 15 and 15' in FIG. 3) positioned at strategic points along the sides of the main conveying line 12. The main conveying line 12 may include a frame 11 which supports the apron 20.

The apron 20 may support a plurality of pusher elements (e.g., divert shoes, belts, etc.) that are mounted to allow for lateral shifting of articles across the apron 20 (e.g., transverse to the primary conveying direction). For example, the pusher elements may generally travel with the apron 20 in the primary conveying direction along either of opposing sides of the apron 20 when the sortation conveyor is operating in a straight-through mode (i.e., the article is moving forwardly for later downstream handling). Alternatively, as will be described in more detail below, the pusher elements may be selectively diverted to slide across the apron 20 in a diagonal path in the divert mode to engage and direct articles onto a branch conveying line (e.g., onto a takeaway conveyor).

Guide tracks or surfaces may be mounted to the frame beneath the conveying surface to engage a guide member extending from each pusher element so as to guide the pusher elements in either the forward direction when in straight-through mode or, alternatively, diagonally across the apron 20 when in the divert mode. In order to initiate the divert mode, a divert switch system may be provided at a pre-selected position along the sortation conveyor 10 (i.e., at a divert station associated with one of the branch lines). The divert switch system intercepts the pusher elements when actuated and directs them toward the predetermined diagonal path necessary to direct an article to the selected takeaway conveyor. A control system is used to determine which pusher elements should be diverted at each divert station in order to direct each article onto the proper branch line.

Figure 2:
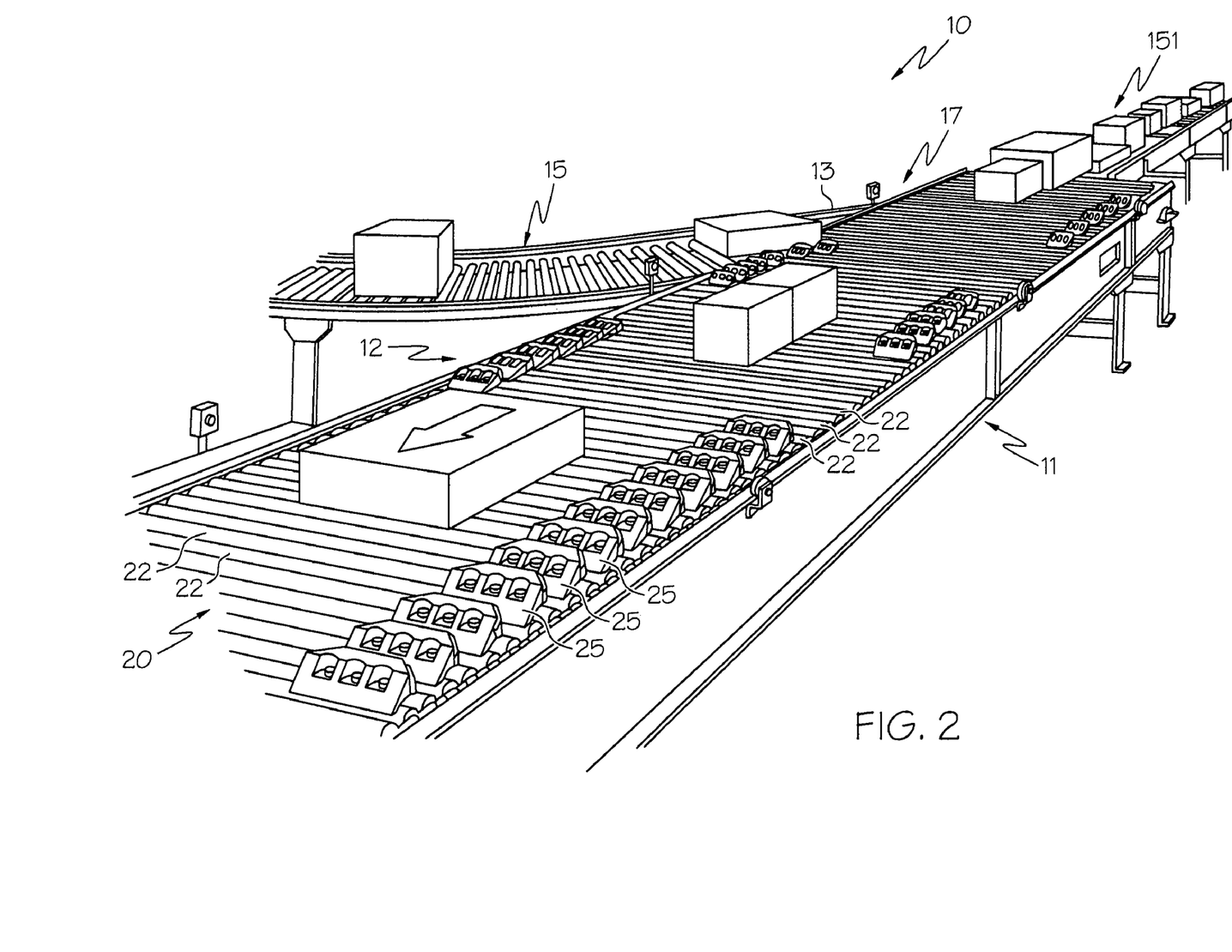
FIG. 2 is a perspective view depicting portions of the conveyor system of FIG. 1.
Figure 3:
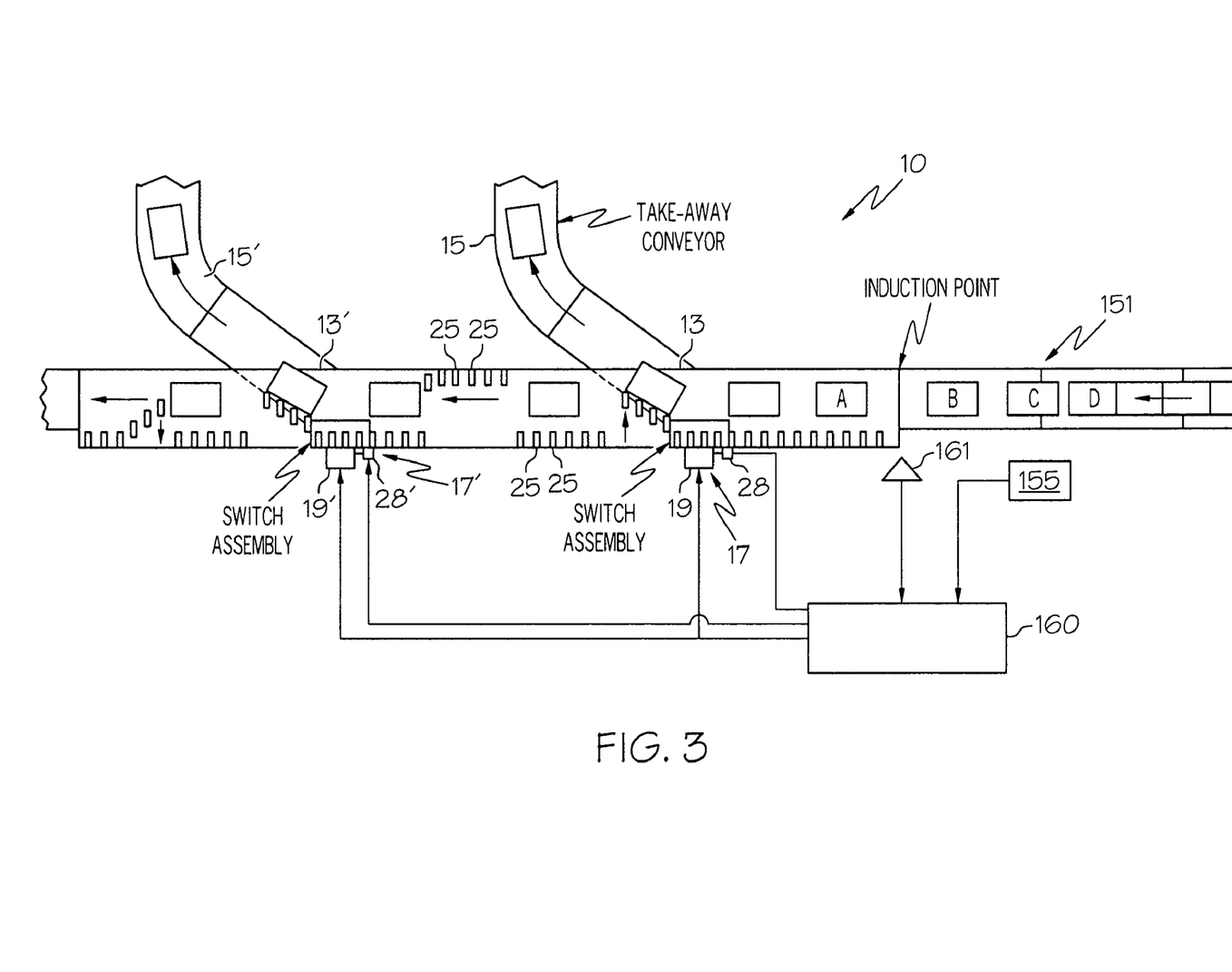
FIG. 3 is a schematic top plan view depicting portions of the conveyor system of FIG. 1.

FIGS. 1-3 depict the sortation conveyor 10 according to one particular embodiment of the present invention. The sortation conveyor 10 includes the frame generally designated as 11 which defines the main conveying line 12. Branch outlets 13 and 13' connect with branch lines 15 and 15', respectively. An apron 20 is supported for driven movement on the frame 11 and defines the primary conveying surface which moves from right to left in FIG. 3. In the embodiment shown in FIG. 2, the apron 20 comprises a pair of roller chains, and multiple parallel cross tubes 22 carried by the chains in spaced relation with each other lengthwise of the apron 20 so that the uppermost portions of these tubes 22 define a discontinuous surface in a horizontal plane on which articles are supported and conveyed. Of course, the apron 20 may be provided by any of a variety of other structures known to those skilled in the art, such as a plurality of interconnected slats in place of the cross tubes 22 (as described, for example, in U.S. Pat. No. 5,217,105, which is incorporated herein by way of reference). It also will be understood that any number of branch outlets and branch lines can be provided, as desired.

The sortation conveyor 10 is configured to receive a series of articles (e.g., cartons) and to selectively direct the articles to one or more locations. In the sortation conveyor shown in FIGS. 1-3, articles delivered by induction conveyor 151 travel along the main conveying line 12 (i.e., on apron 20) and are selectively diverted onto one of the branch lines 15 and 15'. Not all of the articles need be diverted, as some may continue on downstream of the sortation conveyor 10. A takeaway conveyor may also be provided on each branch line (e.g., a moving belt, driven rollers, etc.) in order to transport diverted articles along the branch line, away from the main conveying line.

Articles may be selectively diverted from the main conveying line 12 onto one of the branch lines (e.g., 15 and 15') using pusher elements (e.g., 25) which are selectively moved across the apron 20 at divert stations (17 and 17') located adjacent to each of the branch outlets (e.g., 13 and 13'). In one embodiment, each pusher element (also sometimes referred to as a shoe or divert shoe) is mounted for sliding movement on each pair of adjacent cross tubes 22, as shown in FIG. 2 and as further described in U.S. Pat. No. 4,884,677 ("the '677 patent," which is incorporated herein by reference). In embodiments using slats instead of cross tubes, each pusher element may be mounted for sliding movement on one or more of the slats. Other designs are also possible. For example, the shoes or pusher elements may comprise belt and/or follower elements of a linear belt sorter, such as of the type described in U.S. Pat. Nos. 6,669,001 and 6,854,584 and Canadian Patent No. 2,448,133, which are hereby incorporated herein by reference.

During operation, the pusher elements are retained along either the right-hand or left-hand side of the apron 20, as seen in FIG. 2, and travel with the cross tubes or slat(s) on which each is mounted. When an article traveling on the apron 20 approaches a position (i.e., a divert station) which is opposite the branch outlet through which it is to be diverted, the pusher elements traveling on the apron 20 beside that article are diverted such that they move across the apron 20 in such timed relation that they push the article through the branch outlet and onto the branch conveyor line. Each diverted pusher element slides along the cross tubes or slat(s) upon which it is mounted.

The pusher elements may be provided in any of a variety of shapes and configurations which allow the pusher elements and selected articles to be selectively pushed across the apron 20. In one embodiment, and as further described and depicted in the '677 patent, each of the pusher elements may include a guide pin (33 in FIG. 9 of the '677 patent) which extends downwardly away from the bottom surface of the pusher element. The guide pin may be centered with respect to the pusher element, and may carry a bearing (35 in FIG. 9 of the '677 patent) positioned immediately below the bottom surface of the pusher element.

As previously noted, each of the pusher elements can be retained along the right-hand or left-hand side of the apron 20. This may be accomplished, for example, through use of a channel shaped guide (60 in FIGS. 2 and 4 of the '677 patent) which is proportioned to slidably receive the end of each guide pin. A similar pin guide channel (62 in FIG. 2 of the '677 patent) is provided along the left-hand side of the apron.

At each divert station (17 and 17'), a switch assembly may be provided, as well as at least one guide member (or guide channel) for directing diverted pusher elements laterally across the conveying surface. For example, an angle member (127 in FIG. 2 of the '677 patent) may be provided beneath the apron 20 and extend at an angle with respect to the direction of travel of the apron 20. When activated, the switch assembly diverts pusher elements away from the guide channel in which the guide pin of the pusher element is traveling. For example, if the pusher elements are moving toward a divert station along the right-hand side of the apron 20 (e.g., FIG. 1), the switch assembly selectively diverts pusher elements to the left such that, for example, the bearing on each respective guide pin contacts the angle member (as further described in the '677 patent). As a diverted pusher element continues to move forward with the apron 20, the bearing of the diverted pusher element will continue to travel along the angle member. This results in the diverted pusher element moving to the left along the slat(s) or rollers on which it sits until the pusher element reaches the left-hand side of the apron 20. By way of example, the guide pin of the pusher element may enter a second pin guide channel provided along the left-hand side of the apron (as described in the '677 patent).

As long as the switch mechanism remains activated, successive pusher elements are diverted in the same manner such that a line of pusher elements extends diagonally across the apron 20. An article located on the apron 20 adjacent such diverted pusher elements will thus be diverted into the branch outlet at the divert station. This method of article diversion may also be performed in a similar manner for right-hand diverting.

As best seen in FIG. 3, diverted articles might also rotate as they are diverted. This can occur because, as the diverted pusher elements travel across the apron 20, a downstream pusher element will typically be located further to the left than the adjacent upstream pusher element. As the apron 20 rotates underneath and back towards the upstream end of the sortation conveyor 10, pusher elements that were diverted are returned to the opposite side of the apron 20 in order that such pusher elements are available to repeat the sortation process. While the sortation conveyor 10 is herein described in connection with a shoe sorter of the type shown and described in the '677 patent, the systems and methods described herein may be used in conjunction with other types of sortation conveyors.

The operation of the sortation conveyor 10 is automated in that destination information for each article may be read (e.g., by a bar code or RFID scanner) upstream of the sortation conveyor 10, and a controller (160 in FIG. 3) uses the destination information to divert each article onto the appropriate branch line. For each article which is to be diverted, the controller 160 assigns pusher elements to that article. The controller 160 then actuates the switch assembly of the appropriate divert station when the first of the assigned pusher elements reaches the divert station adjacent the branch line onto which the associated article is to be diverted. In one embodiment, the controller 160 controls the firing (i.e., activating) of the diverter switch mechanisms in order to direct articles to the appropriate branch conveyor line.

The controller 160 may be provided in a variety of forms, and processes signals provided by one or more devices (such as photosensors, scanners, readers, sensors, etc.), in accordance with one or more sets of instructions, and outputs signals which direct the operation of the conveyor system. By way of example, the controller 160 may comprise any device (or combination of devices) which is capable of processing data in accordance with one or more sets of instructions. For example, the controller 160 may include a processor (e.g., a CPU), as well as memory which, among other things, stores data and instructions (i.e., software). Examples include a personal computer, general purpose computer, workstation, server, mainframe, embedded system, microprocessor, programmable logic controller (PLC), discrete logic system, and the like (including combinations of two or more of the foregoing). The controller 160 processes data which it receives (e.g., from a photosensor 161) in order to generate signals for use in actuating the switch assemblies at the proper time in order to properly divert articles onto the appropriate branch line.

In the embodiment shown, a local control module (19 and 19' in FIG. 2) is provided at each divert station. Each local control module 19 and 19' may comprise a controller of the type described above with respect to the controller (e.g., a processor and memory). In the embodiment shown, however, the local control modules 19 and 19' merely ensure that the divert switch at that station is fired (i.e., actuated) between the guide pins of adjacent pusher elements, as further described herein. The local control modules 19 and 19' play no other role in the control system of the sortation conveyor embodiment shown in FIGS. 1-3. The controller 160 may alternatively be provided in direct communication with the switch assemblies at each divert station such that local control modules are not needed. In such embodiments, the controller 160 determines when each switch assembly is actuated and disabled in order to properly divert pusher elements and articles.

Figure 6:
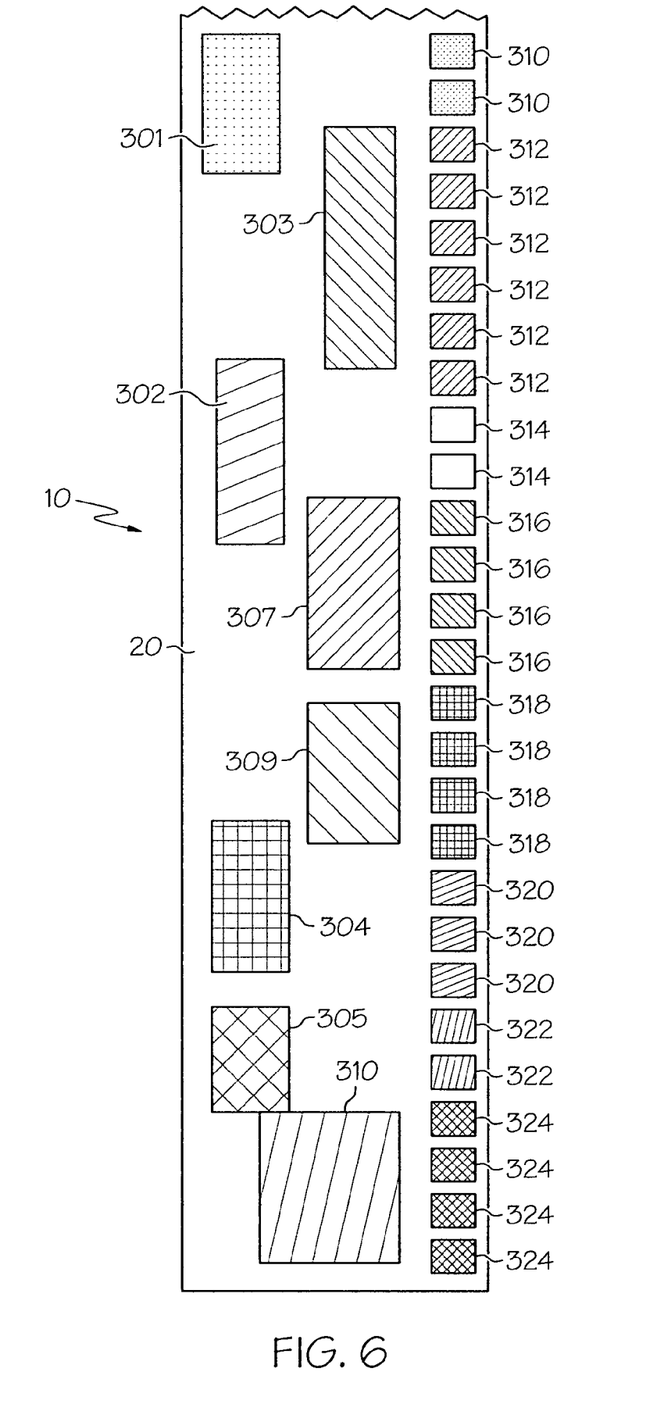
FIG. 6 is a schematic top plan view depicting articles present upon a sortation conveyor in accordance with one embodiment of the present invention.

Articles (e.g., cartons) proceed toward the sortation conveyor 10 along the induction conveyor 151. Some articles can be arranged in a single file line along the induction conveyor 151 such that a gap may or may not be provided between adjacent articles in the movement direction, as shown in FIGS. 1-3. However, other articles can be arranged in two parallel lines extending along the induction conveyor 151 (e.g., as shown with respect to the sortation conveyor 10 in FIG. 6) such that a gap may or may not be provided between adjacent articles in the movement direction and/or in the direction transverse to the movement direction. Gaps between respective articles may be the same or differ. Embodiments of the present invention allow the gaps in the movement direction to be shorter than what was previously possible. In fact, the gap between adjacent articles in the movement direction may be shorter than the width of a single pusher element. As used herein, the width of a pusher element refers to the center-to-center distance of adjacent pusher elements, and therefore includes the small gap present between adjacent pusher elements. In certain circumstances, the gap may even be negative, as described further below, such as when articles are placed side-by-side in a parallel row configuration (e.g., as shown in FIG. 6).

The control system is configured to assign a sufficient number of pusher elements to an article to facilitate proper diverting of that article, while also ensuring that the pusher elements, when diverted across the apron 20 at the proper divert station, will not contact a trailing article which is not supposed to be diverted at that divert station. In this manner, throughput may be increased without increasing sorter speed (i.e., the speed of the apron 20). It should be pointed out, however, that the rotation of articles as they are diverted (see, e.g., FIG. 2) can act as a limit on how small the gap in the movement direction between adjacent articles can be.

Destination information for articles delivered to the sortation conveyor 10 (e.g., by induction conveyor 151) may be provided to the controller 160 in any of a variety of different manners. For example, destination data (i.e., which branch line, if any, a particular article is to be diverted onto) may be manually input into the controller 160 or can alternatively be input as a data set (e.g., a prewritten data file). Alternatively, in the embodiment shown, a destination detecting device 155 (FIG. 3) in communication with the controller 160 may be provided, such as adjacent the induction conveyor 151. By way of example, the destination detecting device 155 may comprise an optical scanner (e.g., a bar code reader) which scans a portion of each article for a tag or label affixed to the article (e.g., including a bar code) as each article passes by the scanner. Alternatively, the destination detecting device may comprise a reader which detects identifying information associated with each article. Such a reader may comprise, for example, an RFID reader which acquires data from an RFID tag (active or passive) associated with (e.g., within, upon or attached to) each article. The signal(s) provided by the destination detecting device to the controller 160 may represent not only destination data for each article inducted onto the apron 20 of the sortation conveyor 10, but also other data concerning an article (e.g., article dimensions and/or weight). The destination data for an article indicates which branch conveyor line, if any, each article is to be diverted onto.

A sensor, such as a photosensor 161, may also be provided at a predetermined point upstream of, or along the apron 20 of, the sortation conveyor 10. In one embodiment, the photosensor 161 can be located adjacent to the induction conveyor 212 and/or by the first endless belt 214 of the gap optimizer 213. In another embodiment, the photosensor 161 can be located immediately upstream of the sortation conveyor 10, adjacent the induction conveyor 151. The photosensor 161 is in communication with the controller 161 and detects the leading and trailing edges of each article passing by the photosensor 161. As discussed further herein, additional photosensors 28 and 28' may also be provided at or adjacent to the switch assembly of each divert station in order to, for example, detect passage of the bearing on the guide pin of each pusher element which passes by. Of course, other types of sensing devices may be used to sense the leading and trailing edges of articles and the passage of pusher elements (or portions thereof, such as the guide pins or guide pin bearings). In certain embodiments, the destination detecting device 155 and the photosensor 161 can be combined into a single device which provides signals to the controller 160.

The controller 160 uses the signals from the destination detecting device 155 and the article sensor 161 in order to effect actuation of the divert switch mechanisms at the proper time, in accordance with stored instructions (e.g., software). The control system software takes into account the gap between adjacent articles and whether or not adjacent articles are being diverted to the same branch conveyor line.

As described in more detail below, the controller 160 tracks articles as they move through the sortation conveyor 10. When an article arrives at the divert station associated with the branch line onto which that article is supposed to be diverted, the controller 160 can send an "enable" signal to the local control module (e.g., 19 and 19') of that divert station. In response, the local control module actuates the switch mechanism. In one embodiment, however, the switch mechanism is not necessarily actuated immediately upon receipt of the enable signal from the controller 160. Rather, the local control module (19 and 19') actuates the switch mechanism so as to ensure that the switch is actuated between guide pins of respective pusher elements. For example, photosensors 28 and 28' may be positioned so that they are able to detect the passing of each guide pin, particularly the bearing on each guide pin. In one embodiment, photosensors 28 and 28' may be positioned beneath or adjacent the apron 20 so that they are able to detect the passing of the guide pin bearing on each pusher element. Photosensors 28 and 28' may be provided in communication with local control modules 19 and 19', respectively, as well as the controller 160. Photosensors 28 and 28' may simply provide a signal which indicates whether or not the photosensor is blocked by a guide pin bearing (e.g., an ON signal when blocked and an OFF signal when not blocked, or vice versa).

The local control module uses the signal from divert station photosensor 28 to determine when to actuate the switch mechanism following receipt of an enable signal from the controller 160 so that the switch is only fired between guide pins. The manner in which this is done may depend, for example, on the location of the photosensors 28 and 28' with respect to the switch mechanism of the associated divert station, as well as the speed of the conveying surface. For example, once the local control module (19 or 19') has received the enable signal from the controller 160, the local control module may actuate the switch mechanism on the next triggering edge of a bearing. The triggering edge may simply correspond to the moment that the photosensor signal changes state—from OFF to ON, or from ON to OFF. Thus, depending on the speed of the sortation conveyor and the location of the photosensor, the local control module, after receiving the enable signal from the controller 160, may actuate the switch upon receipt of an OFF or an ON signal from the associated photosensor 28. In this manner, the local control module ensures that the switch is actuated between the guide pins on adjacent pusher elements.

Following switch actuation, the switch remains open for a period of time so that the appropriate number of pusher elements are diverted for the article being directed onto the branch line. In one embodiment, at least two pusher elements are diverted for each article. With or shortly after the enable signal, the controller 160 may send a signal to the local control module indicating how many pusher elements are to be diverted. The local control module may then count how many guide pin bearings have passed based upon signals received from the photosensor 28. Once the appropriate number of guide pin bearings have been detected, the local control module closes (i.e., disables) the switch mechanism, thereby preventing subsequent pusher elements from being diverted. In this manner, the article is properly diverted onto the branch line by the movement of the series of pusher elements across the apron 20.

Alternatively, the controller 160 may receive signals from the local photosensors (28 and 28') and count the number of pusher elements following switch actuation. After the appropriate number of pusher elements (i.e., guide pin bearings) have been detected, the controller 160 may disable (i.e., close) the switch, either directly or by sending a signal to the local control module. In fact, in some embodiments, the local control modules may be eliminated entirely and the controller 160 can control actuation and disablement of the switch mechanisms.

The number of pusher elements diverted for any given article shall be sufficient to complete the operation of pushing the article through the appropriate branch outlet. This may be accomplished by "assigning" pusher elements to each article to be diverted. Then, when the first assigned pusher element reaches the divert station for that article, the switch at that divert station is actuated. In one embodiment, the first pusher element which, if diverted, would contact the front edge of the article is assigned to that article and is identified as the "lead pusher element" or "lead shoe"—i.e., the first pusher element which is diverted for a given article. All of the pusher elements following the lead pusher element which, if diverted, would contact the article, can also be assigned to that article. The pusher elements assigned for a given article can also include the last pusher element which, if diverted, would contact the article, as well as a predetermined number of trailing pusher elements following that last pusher element. These trailing pusher elements (e.g., one, two, three, or perhaps more) can be included in the series of pusher elements which are diverted for a given article, even though these trailing pusher elements normally will not actually contact the article as they move across the apron. One purpose of the trailing pusher elements is to ensure that an article does not spin off of the pusher elements while being diverted. However, as further discussed herein, a control system in accordance with one embodiment of the present invention can be configured to cancel one or more of the trailing pusher elements, or even the last pusher element which will contact an article if diverted, if it is determined by the controller that those trailing pusher elements (or even the last article-contacting pusher element) will contact the upstream article if diverted.

The controller 160 is responsible for "assigning" pusher elements to each article. The assigned pusher elements are those which are to be diverted at the appropriate divert station in order to push the article onto the proper branch conveyor line. However, the controller 160 does not assign any type of identifier (e.g., a number or other identifier) to individual pusher elements. Instead, the controller 160 simply assigns pusher elements to an article and then monitors the travel of the assigned pusher elements as they progress along the length of the sortation conveyor. At the moment the controller 160 determines that the lead pusher element assigned to an article arrives (or is about to arrive) at the divert station for that article, the enable signal is sent to the local control module of that divert station.

In one embodiment, pusher elements may be "assigned" to each article in the following manner. The distance from each divert station, particularly the switch mechanism thereof, to the induction point (see FIG. 2) is measured as a multiple of the width of each pusher element. For example, the distance from the induction point (i.e., where the induction conveyor 151 meets the conveying surface 20 of the sortation conveyor 10) to the switch mechanism of the first divert station 17 might be the width of four pusher elements, and the distance to the switch mechanism of the second divert station 17' might be the width of nine pusher elements. By measuring distances in this manner, pusher elements may be "assigned" to articles without the need for uniquely identifying each individual pusher element.

In particular, the software associated with the controller 160 can establish a data array which tracks the location of pusher elements as they move through the sortation conveyor. This data array may generally comprise two rows of cells. The number of columns will depend on the length of the sortation conveyor, and particularly the distance from the induction point to the last divert station.

Figure 4:
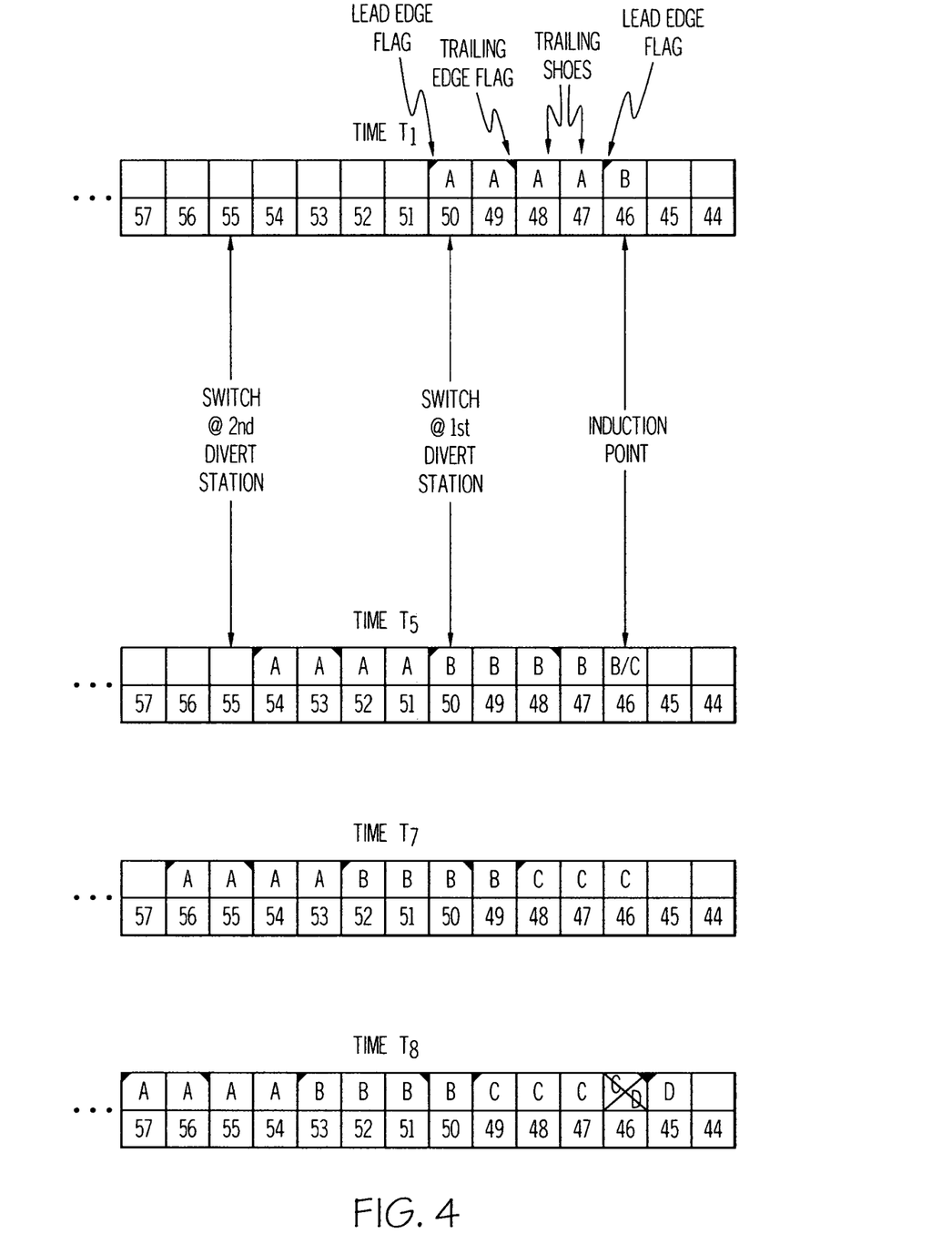
FIG. 4 is a schematic illustration depicting a data array used by the control system of a sortation conveyor in accordance with one embodiment of the present invention.

As shown in FIG. 4, which is a simplified illustration of this data array, one row of the data array (in the depicted example, the bottom row) simply comprises a sequential series of integers which correspond to locations along the length of the apron 20. For example, the first divert station is arbitrarily identified as 50. Each cell in the lower row of the data array is also defined to have a width equal to the width of each pusher element (the center-to-center distance between adjacent pusher elements). Thus, in the example wherein the switch mechanism of the first divert station is located a distance of four pusher elements from the induction point, the induction point corresponds to the cell containing numeral 46 in the data array. Similarly, the switch mechanism of the second divert station corresponds to numeral 55 in the bottom row of the data array. The upper row of cells in the data array generally correspond to pusher elements as they travel the length of the apron 20 of the sortation conveyor 10. As the sortation conveyor 10 is operating and the pusher elements travel the length of the apron 20, the position of particular pusher elements move from right to left in the sample data array of FIG. 4. Since the number of columns in the data array is dependent on the length of the sortation conveyor (which is less than the total number of pusher elements multiplied by the width of a pusher element), typically less than half of all pusher elements will be represented by a cell in the upper row of the data array at any given time.

In order to simplify the description of the process of assigning pusher elements to individual articles, the photosensor 161 in one embodiment is located at the induction point. However, the photosensor could be located at any point upstream of the first divert station. At time T1, the leading edge of article B is detected by the photosensor 161 and the divert location for article B was previously (or contemporaneously) determined by the destination detecting device 155 or some other device and is provided to the controller 160.

As shown in FIG. 3, when the leading edge of article B is detected, the cell in the data array located immediately above numeral 46 (corresponding to the induction point) is identified as being assigned to article B (e.g., by placing some form of article identifier in the cell of the data array). Since the cells in the upper row of the data array generally correspond to the location of a portion of the pusher elements, the cell above numeral 46 which is assigned to article B corresponds to the first pusher element which would contact the front (or leading) edge of article B if that pusher element is diverted. If the divert location for article B is not the same as the divert location for the previous (i.e., downstream) article A, the cell located above numeral 46 in the data array is not assigned to article B if that cell has previously been identified as one that would contact the previous/downstream article A if that pusher element is diverted (as further described below). The first cell assigned to article B is also identified with a lead edge flag in that cell, indicating that the pusher element represented by this cell at time T1 will not only contact article B if diverted, but also is the first pusher element assigned to article B.

Over time, the information in the cells of the upper row of the data array will move from right to left in the data array. In other words, at time T2, the information which was in the cell located above numeral 50 in the data array at time T1 will be in the cell located above numeral 51 in the data array at time T2. Each time interval may correspond to the amount of time it takes each pusher element to advance the width of one pusher element. However, in one embodiment, rather than establishing a time interval based on a measured or predetermined speed of the conveying surface, the controller 160 may use the signal from the photosensor 28 at the first divert station 17 to control the shifting of data in the upper row of cells in the data array. In particular, the information stored in the upper row of cells will shift one cell to the left each time the photosensor 28 detects, for example, the leading edge of a guide pin bearing. As the photosensor 28 is located at the first divert station and thus prior to diversion of any pusher elements, the photosensor 28 is capable of detecting the passage of every pusher element. In the embodiment shown, downstream photosensors (e.g., 28') will not detect the passage of guide pin bearings on pusher elements which were diverted to the opposite side of the apron 20 at an upstream divert station.

Following assignment of the lead edge cell for article B at time T1, at each subsequent time interval T2, T3, etc. (as measured by the detection of subsequent pusher elements by the photosensor 28), the cell located above numeral 46 will be assigned to article B until the trailing edge of article B is detected by the photosensor 161. When the trailing (or rear) edge of article B is detected, the cell immediately above numeral 46 in the data array is not only assigned to article B, but also includes a trailing edge flag. This trailing edge flag indicates that this cell corresponds to the last pusher element which, if diverted, will contact article B. One or more trailing cells may also be assigned to article B in order to help prevent article B from spinning off of the pusher elements when diverted. In the example shown in FIG. 4, the control system automatically assigns two trailing cells to each article (although any number of trailing cells may be assigned). Thus, at time T5 (four time intervals after T1), it is seen that five cells are assigned to article B, one of which includes a lead edge flag, and one of which includes a trailing edge flag.

If article B is designated to be diverted at the first divert station (i.e., corresponding to numeral 50 in the lower row of the data array), as soon as the data array is updated such that the identifier for article B is in the cell immediately above numeral 50, the controller 160 will send the enable command to the local control module 19 at the first divert station 17. Similarly, once the cell immediately above numeral 50 in the data array no longer includes an identifier for an article to be diverted at the first divert station (time T9 in the example of FIG. 4), the controller 160 will disable the switch mechanism at the first divert station 17.

As also shown in FIG. 4, when the next article C arrives at the induction point (T5), the cell assignment process is repeated. In this instance, when the front edge of article C is identified, the cell located above numeral 46 in the data array at that time is already assigned to article B. If that cell were not only assigned to article B, but also included a trailing edge flag, the pusher element corresponding to that cell, if diverted, would contact both articles B and C. In such instance, the control system will deem this cell to be "dead" and no article identifier would be inserted into that cell in the data array (i.e., the identifier for article B would be removed).

In the example shown, however, the cell above numeral 46 at time T5 when the leading edge of article C is detected is merely identified as a trailing pusher element for article B (since a trailing edge flag is not present). In this instance, the identifier in the cell above numeral 46 is changed from article B to article C, and a leading edge flag is inserted. Thus, at time T7, the cell above numeral 48 in the data array is identified to article C, rather than article B, and includes a lead edge flag.

Figure 5A:
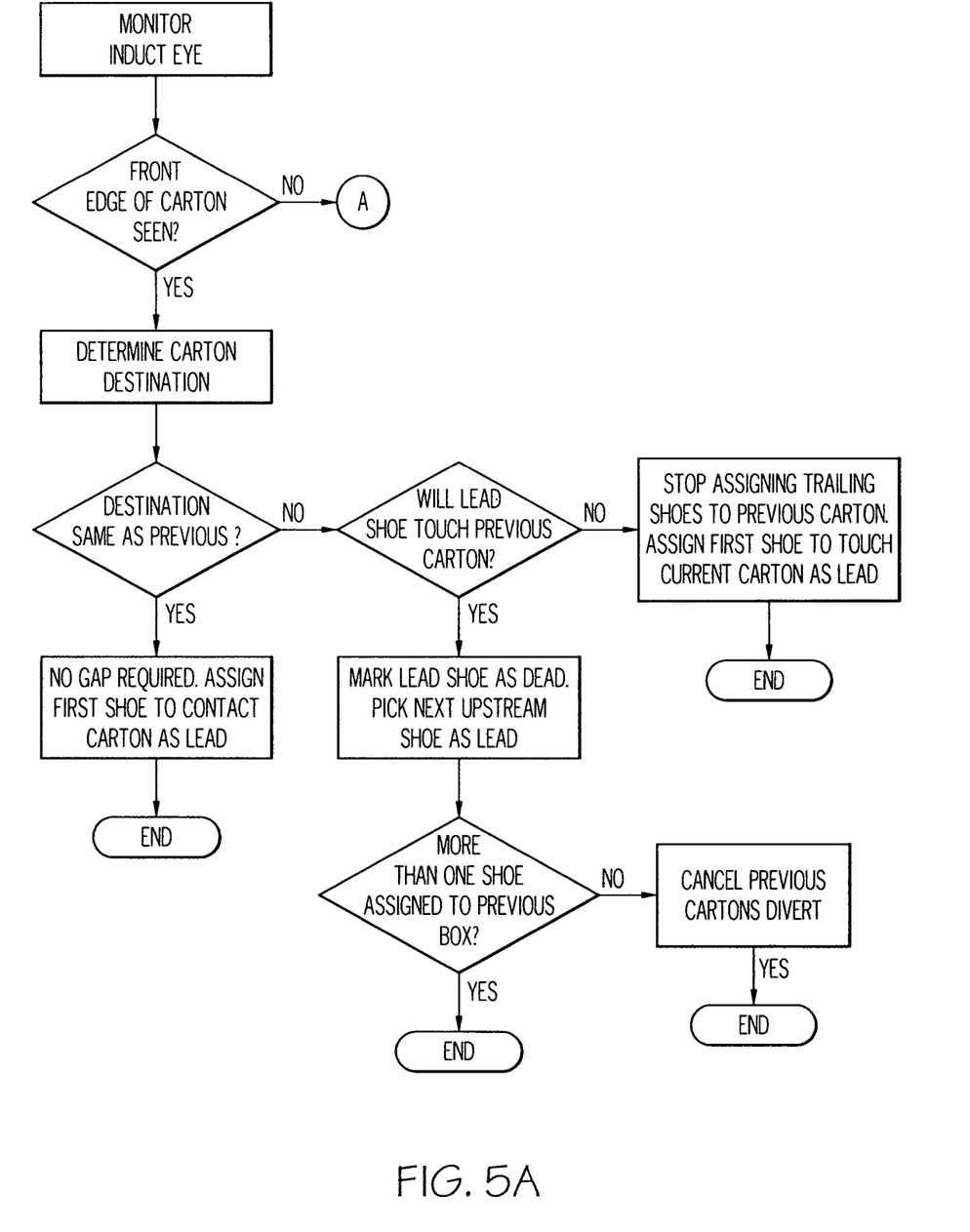
FIG. 5 is a flow chart depicting the assignment of pusher elements to articles by the control system of a sortation conveyor in accordance with one embodiment of the present invention.
Figure 5B:
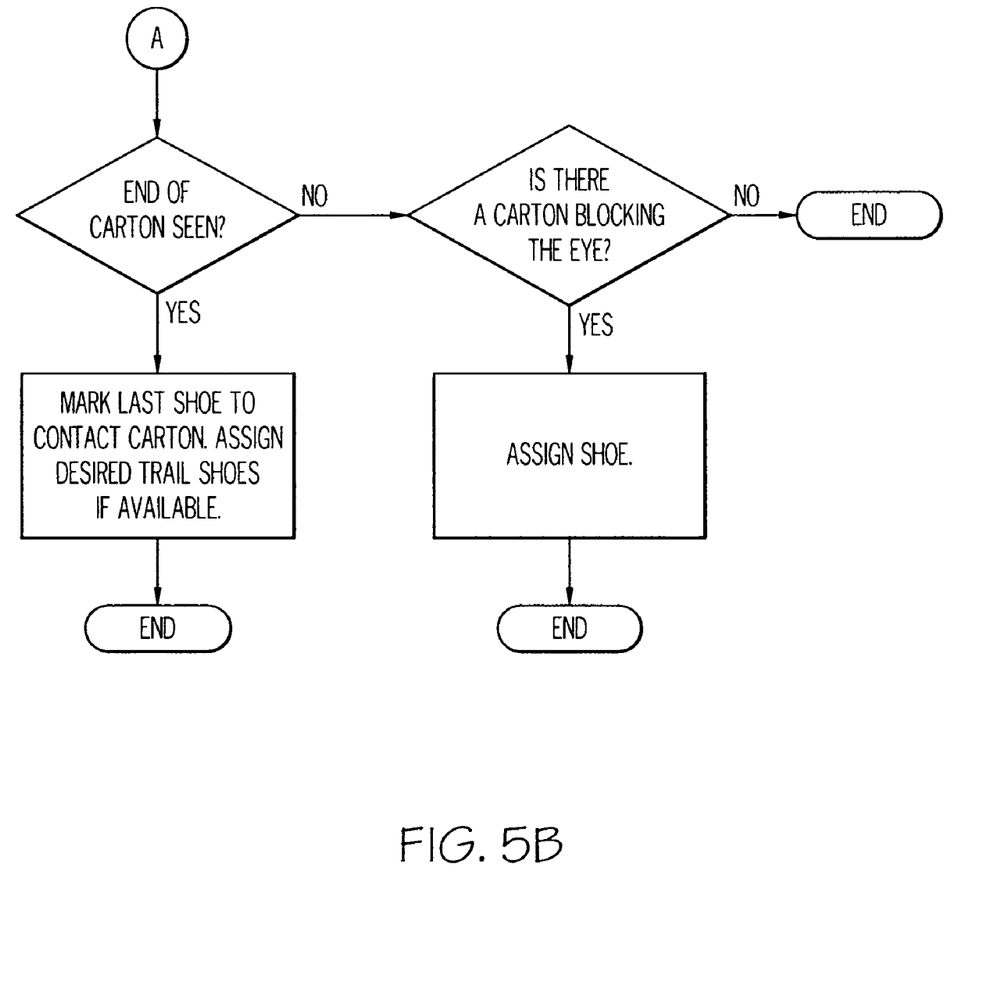

During time interval T8, the photosensor 161 is shown to have detected not only the trailing edge of article C, but also the leading edge of article D. This situation can occur because the control system can allow for gaps between articles which are less than the width of a single pusher element. If articles C and D are to be diverted at the same divert station, and onto the same branch line, the cell immediately above numeral 46 in the data array is simply reassigned to article D and is identified with the lead edge flag. On the other hand, if articles C and D are not supposed to be diverted at the same divert station, the cell located above numeral 46 in the data array will be designated as "dead," and will include neither an identifier for article C nor an identifier for article D. The next upstream cell (i.e., the cell above numeral 45 in the data array) is then assigned to article D and includes a lead edge flag. A flow chart is provided in FIG. 5 describing the process of assigning cells to pusher elements (which are therein referred to as "shoes").

As the take-away conveyors of the branch conveyor lines (15 and 15') may travel at a slower rate than the conveying surface 20 of the sortation conveyor 10, a branch conveyor line (e.g., 15 or 15' in FIG. 3) may sometimes become backed up if too many articles are diverted onto that branch conveyor line. As such, a conveyor system in accordance with one embodiment of the present invention may be configured to ensure that the branch conveyor lines do not become overloaded with diverted articles. If an overload condition is detected, the controller 160 can ensure that additional articles are not diverted to that branch conveyor line until the overload condition is resolved.

Many of the foregoing examples describe and depict operation of a conveyor system in accordance with the teachings of the present invention in which transported articles enter the sortation conveyor 10 in a single file line. However, as previously indicated, it will be appreciated that a conveyor system in accordance with the teachings of the present invention can accommodate two parallel rows of articles present in a side-by-side configuration upon the sortation conveyor 10. In order to facilitate this functionality, and through use of the gap optimizer (213 in FIG. 1) and the shift conveyor (220 in FIG. 1), the conveyor system is configured to optimally position articles so that they enter the sortation conveyor 10 in a predetermined arrangement.

This predetermined arrangement can be determined by the controller 160 based upon the dimensions and intended destination of the articles to be sorted by the sortation conveyor 10. The intended destination of the articles to be sorted can be determined by the controller 160 through analysis of data received from the destination detecting device 155 as described above and which may be located in any of a variety of locations along the conveyor system. In one particular embodiment, the destination detecting device 155 can be located adjacent to the induction conveyor 212 and/or the first endless belt 214 of the gap optimizer 213. Dimensions of an article can be determined in any of a variety of manners. For example, through receipt of data from sensors (e.g., photosensors, light curtains, or Doppler sensors), the controller 160 can determine the dimensions of an article in both the direction of movement of the article along the conveyor system as well as in the direction transverse to the direction of movement. In one particular embodiment, these sensors can be located adjacent to the induction conveyor 212 and/or any conveyor downstream thereof. In another embodiment, one or more dimensions of an article can be determined by the controller 160 from data received from the destination detecting device 155. For example, the controller 160 might obtain data from the destination detecting device 155 corresponding to a bar code present upon an article, wherein that data can indicate the dimensions of the article. Other sensors can measure the length of the article in the movement direction upon the conveyor system, and the control system 160 can then determine or approximate the other dimensions of the article.

Once the dimensions and destination for a particular article are determined by the controller 160, the controller 160 can control the operation of the gap optimizer 213 and the shift conveyor 220 so that the article is positioned in a predetermined location relative to other articles for passage onto the sortation conveyor 10. In certain circumstances, this predetermined position might result in placement of an article alongside (as opposed to in a single-file line) another article upon the sortation conveyor 10. The controller 160 can strategically determine the placement of articles in a side-by-side arrangement so that articles can be diverted at the required locations without interfering with other articles present upon the sortation conveyor 10 and which have not already been diverted. This can be achieved by assigning some pusher elements to an article on one side of the sortation conveyor, and then assigning the remaining pusher elements to an article on the other side of the sortation conveyor which is partially adjacent to and overlapping with (but not completely coextensive with) the first article.

FIG. 6 provides one embodiment of how articles might be arranged upon a moving apron 20 of a sortation conveyor 10. The articles are shown to include articles 301, 302, 303, 304, 305, 307, 309, and 310. The articles 301, 302, 304, and 305 are shown to be justified to the left side of the apron 20 (having been moved by the shift conveyor 220). The articles 303, 307, 309 and 310 are shown to be justified to the right side of the apron 20. As can be seen, certain of the articles (e.g., articles 301 and 303) are placed partially side-by side and overlap in the direction of travel, thereby resulting in a negative gap in the movement direction between those articles. Other articles (e.g., article 310) are not placed side-by-side with other articles, perhaps either because the article is itself so wide that another article cannot effectively be placed beside the article upon the apron 20 (as is likely the case with article 310), or perhaps because the controller 160 determined that effective diversion of those articles from the apron 20 could not be achieved if a side-by-side arrangement were provided.

Even when articles are placed side-by-side upon a sortation conveyor, pusher elements can be assigned to those articles by the controller 160 much in the same way as described above with respect to assignment of pusher elements to articles in a single file line. For example, in the example of FIG. 6, pusher elements 310 are assigned to divert article 301, pusher elements 312 are assigned to divert article 303, pusher elements 314 are assigned to divert article 302, pusher elements 316 are assigned to divert article 307, pusher elements 318 are assigned to divert article 309, pusher elements 320 are assigned to divert article 304, pusher elements 322 are assigned to divert article 305, and pusher elements 324 are assigned to divert article 310. In use, and as an example, article 301 can first be diverted onto a first branch line by the pusher elements 310. Article 302 can then be diverted onto a second branch line (downstream from the first branch line) by the pusher elements 314. With articles 301 and 302 already having been diverted from the apron 20, article 303 can then be diverted onto a third branch line (downstream from the first and second branch lines) by the pusher elements 312. The other articles 304, 305, 307, 309, and 310 can then be diverted to the appropriate branch lines (which may or may not comprise one of the first, second or third branch lines) by their respectively assigned pusher elements. Accordingly, based upon the destinations of various articles, the controller can overlap articles when appropriate and can assign pusher elements to each article (having an aggregate length less than that of the article) to thereby create negative gap between articles and provide an increase in conveyor throughput. While certain articles in FIG. 6 are shown to partially overlap, it will be appreciated that one or more articles upon a sortation conveyor may be entirely overlapped by another article (e.g., when the overlapping articles have a common destination).

The controller can include any of a variety of software algorithms to effectuate the predetermined placement of articles upon the apron 20 of the sortation conveyor 10. For example, one software algorithm can be configured such that, if (1) a lead article is on the divert side of the apron of a sortation conveyor (e.g., article 301 in FIG. 6) and is assigned to an upstream divert position, or (2) a lead article is on the pusher element side of the apron of a sortation conveyor (e.g., article 306 in FIG. 6) and is assigned to a downstream divert position, then there may be a possibility for overlap. If this occurs and the lead article has more than two pusher elements assigned to it, then, if the combined width of the lead article and a second article is less than the width of the apron, then the shift conveyor may be used to place the second article beside the lead article to result in an overlapping or zero gap arrangement. However, if the lead article has less than two pusher elements assigned to it, then, the leading edge of the second article can be aligned with a new pusher element.

By allowing articles to overlap in the moving direction (e.g., as with articles 301 and 303), it will be appreciated that a conveyor system in accordance with the teachings of the present invention can accommodate a greater volume of articles at a given speed than it could by maintaining all articles in a single file row as is typical of conventional designs.

In order to facilitate operation of the conveyor system, the controller 160 can learn of an article's dimensions and intended destination before, while on, or after the article encounters the transport conveyor 212. Depending upon the intended destination of the article relative to that of adjacent articles, the controller 16o can then determine which row that article will ultimately be placed in upon the sortation conveyor 10. Based upon this determination, the controller 160 can regulate the speed of the gap optimizer 213 so that the gaps between the article and adjacent articles in the movement direction will be as desired once those articles are all present upon the sortation conveyor 10. As the controller 160 can monitor the speed of the sortation conveyor 10, the transport conveyor 151, the shift conveyor 220, and the gap optimizer 213, the controller 160 can effectively control the gap optimizer 213 to provide a gap in the movement direction between adjacent articles which will ultimately cause those adjacent articles to reside a predetermined distance from one another upon reaching and resting upon the sortation conveyor 10. The controller 160 can assign pusher elements of the sortation conveyor 10 to respective articles before those articles even arrive at the sortation conveyor 10. For example, the controller 160 can assign pusher elements of the sortation conveyor 10 to respective articles upon entry of those articles to the shift conveyor 220, or even upon entry to the gap optimizer 213. Likewise, the controller 160 can assign sliding shoes (e.g., 222) of shift conveyor 220 to respective articles before those articles even arrive at the shift conveyor 220.

As one particular example, the controller can implement an algorithm in which first and second articles are received and scanned. If the combined width of the first and second articles is less than the width of the apron, and if the destination for the second article is upstream of the destination for the first article, and if the first article is already assigned or placed on the non-divert side of the sortation conveyor (next to pusher elements), then the second article can be placed on the divert side of the sortation conveyor (opposite the pusher elements) and the articles are overlapped (e.g., by at least one pusher element) through use of the shift conveyor and gap optimizer, and pusher elements common to both articles are assigned to the first article. Instead, if the combined width of both articles is less than the width of the apron and the destination of the second article is downstream from the destination of the first article and the first article is already assigned or placed on the non-divert side of the sortation conveyor, then the second article can be placed with little or no gap from the first article and the last pusher element corresponding with the first article can be assigned to the second article. If the combined width of the first and second articles is less than the width of the apron, and if the destination for the second article is upstream of the destination of the first article, and if the first article is already assigned or placed on the divert side of the sortation conveyor, then both articles can be placed with little or no gap between them and the last pusher element corresponding with the first article can be assigned to the first article. If the combined width of both articles is less than the width of the apron and if the destination of the second article is downstream from the destination of the first article, and if the first article is already assigned or placed on the divert side of the apron, then the second article can be placed on the non-divert side of the sortation conveyor, and the articles can be overlapped by at least one pusher element through use of the shift conveyor and gap optimizer, and pusher elements common to both articles can be assigned to the second article. The length of an article can also be taken into account by the controller when determining the position of the article with respect to other articles present upon the sortation conveyor.

As can be understood the functionalities of the systems, methods, models, and algorithms described herein can be implemented using software, firmware, and/or associated hardware circuitry for carrying out the desired task. For instance, the various functionalities described can be programmed as a series of instructions, code, or commands using general purpose or special purpose programming languages, and can be executed on one or more general purpose or special purpose computers, controllers, processors or other control circuitry.

The foregoing description of embodiments and examples of the invention has been presented for purposes of illustration and description. It is not intended to be exhaustive or to limit the invention to the forms described. Numerous modifications are possible in light of the above teachings, and not every feature, principle, and advantage described needs to be used, as various combinations and subcombinations are possible. Some of those modifications have been discussed, and others will be understood by those skilled in the art. The embodiments were chosen and described in order to best illustrate the principles of the invention and various embodiments as are suited to the particular use contemplated. The scope of the invention is, of course, not limited to the examples or exemplary embodiments set forth herein, but can be employed in any number of applications and equivalent devices by those of ordinary skill in the art. Thus, although many inventive aspects have been presented, such aspects need not be utilized in combination in a given system, device, or method, and various combinations and subcombinations of inventive aspects may be used in a given system, method, or device while still falling within the scope of the claims. Accordingly, the above description is intended to embrace all possible alternatives, modifications, combinations, subcombinations, and variations that have been discussed or suggested herein, as well as others that fall within the principles, spirit, and broad scope of the various inventions as defined by the claims.

What is claimed is:

1. A conveyor system for selectively diverting articles from a primary conveying surface onto one of a plurality of branch lines, comprising a sortation conveyor comprising a driven primary conveying surface for supporting and transporting articles thereon;

two or more branch lines extending away from the primary conveying surface;

a plurality of pusher elements mounted for movement with the primary conveying surface for selective movement across the primary conveying surface so as to selectively divert articles onto the branch lines;

activating elements configured to divert said pusher elements across said primary conveying surface; and a control system configured for selectively operating the activating elements, wherein the control system is configured to assign one or more of the pusher elements to the article to be diverted, and to selectively operate the activating elements when the assigned pusher elements are located adjacent a predetermined branch line for the article to which the pusher elements are assigned, wherein the control system is configured to facilitate transporting articles in an at least partially laterally overlapping side-by-side configuration along the primary conveying surface and to ensure proper diversion of articles from the primary conveying surface to any of a plurality of secondary paths assigned to the articles.

2. A conveyor system for selectively diverting articles from a primary conveying surface onto one of a plurality of branch lines, comprising a sortation conveyor comprising a driven primary conveying surface for supporting and transporting articles thereon;

two or more branch lines extending away from the primary conveying surface;

a plurality of pusher elements mounted for movement with the primary conveying surface for selective movement across the primary conveying surface so as to selectively divert articles onto the branch lines;

activating elements configured to divert said pusher elements across said primary conveying surface;

a control system configured for selectively operating the activating elements, wherein the control system is configured to assign one or more of the pusher elements to the article to be diverted, and to selectively operate the activating elements when the assigned pusher elements are located adjacent a predetermined branch line for the article to which the pusher elements are assigned, wherein the control system is configured to facilitate transporting articles in an at least partially laterally overlapping side-by-side configuration along the primary conveying surface and to ensure proper diversion of articles from the primary conveying surface to any of a plurality of secondary paths assigned to the articles; and a shift conveyor in communication with the control system and configured to position the adjacent articles in the overlapping configuration based upon signals from the control system.

3. The system as recited in claim 2, wherein the shift conveyor is configured to place adjacent overlapping articles along a set of pusher elements and wherein the control system is configured to assign some pusher elements in the set to the first overlapping article and the remainder of the pusher elements in the set to the second overlapping article.

4. A conveyor system for selectively diverting articles from a primary conveying surface onto one of a plurality of branch lines, comprising
a sortation conveyor comprising a driven primary conveying surface for supporting and transporting articles thereon;
two or more branch lines extending away from the primary conveying surface;
a plurality of pusher elements mounted for movement with the primary conveying surface for selective movement across the primary conveying surface so as to selectively divert articles onto the branch lines;
activating elements configured to divert said pusher elements across said primary conveying surface; and
a control system configured for selectively operating the activating elements, wherein the control system is configured to assign one or more of the pusher elements to the article to be diverted, and to selectively operate the activating elements when the assigned pusher elements are located adjacent a predetermined branch line for the article to which the pusher elements are assigned, wherein the control system is configured to facilitate transporting articles in an at least partially laterally overlapping side-by-side configuration along the primary conveying surface and to ensure proper diversion of articles from the primary conveying surface to any of a plurality of secondary paths assigned to the articles;
wherein the control system is configured to completely overlap adjacent articles when the articles have the same destination.

5. A conveyor system for selectively diverting articles from a primary conveying surface onto one of a plurality of branch lines, comprising
a sortation conveyor comprising a driven primary conveying surface for supporting and transporting articles thereon;
two or more branch lines extending away from the primary conveying surface;
a plurality of pusher elements mounted for movement with the primary conveying surface for selective movement across the primary conveying surface so as to selectively divert articles onto the branch lines;
activating elements configured to divert said pusher elements across said primary conveying surface;
a control system configured for selectively operating the activating elements, wherein the control system is configured to assign one or more of the pusher elements to the article to be diverted, and to selectively operate the activating elements when the assigned pusher elements are located adjacent a predetermined branch line for the article to which the pusher elements are assigned, wherein the control system is configured to facilitate transporting articles in an at least partially laterally overlapping side-by-side configuration along the primary conveying surface and to ensure proper diversion of articles from the primary conveying surface to any of a plurality of secondary paths assigned to the articles; and a detector configured to detect the dimension of articles, wherein the control system is configured to utilize the dimension to determine whether articles can be laterally overlapped.

6. The system as recited in claim 1, further comprising:
a gap optimizer configured to reduce the gap between articles in the primary conveying direction in response to signals from the control system, adjust article gaps based on a determined destination, and determine article routing before or at the time of a dynamic gap adjustment.

7. The system as recited in claim 1, further comprising:
a detector configured to detect a signal representing the destination of each article and transmit the signal representing the destination to the control system.

8. The system as recited in claim 7, wherein the detector comprises at least one of a bar code reader and an RFID sensor.

9. A method for efficiently conveying articles comprises receiving an article, comprising:
measuring the width of the article;
determining the destination of the article;
based upon the width and destination, automatically determining whether the article should overlap with a preceding article received; and
if it is determined that the article can overlap with the preceding article, automatically placing the article on a sortation conveyor on one side of the sortation conveyor adjacent a second side of the sortation conveyor containing the preceding article such that a portion of the article is located along the side of a portion of the preceding article and overlaps the preceding article.

10. The method as recited in claim 9, further comprising:
comparing the destinations of the article and preceding article; and
if it is determined that the article is to be sent to the same destination as the preceding article, completely overlapping the article and preceding article and assigning pusher elements to the article which are the same pusher elements assigned to the preceding article.

11. The method as recited in claim 9, further comprising:
comparing the destinations of the article and preceding article; and
if it is determined that the article has a destination downstream from the destination of the preceding article, partially laterally overlapping the article and preceding article by at least one pusher element.

12. The method as recited in claim 9, further comprising:
comparing the combined total width of the article and the preceding article to the width of the conveying surface; and
if the combined total width of the article and the preceding article exceeds the width of the conveying surface, automatically placing the article and preceding article on the conveyor without any lateral overlap of the article and preceding article.

13. A method for assigning shoes to articles on a sorting conveyor, comprising:
obtaining a length of an article to be conveyed;
obtaining a destination of the article; and
based upon the destination and length of the article and the destination and length of a preceding article, automatically determining whether a) the article should be assigned pusher elements that will be adjacent the side of the preceding article, or b) the article should be assigned pusher elements that will be upstream from the preceding article with no additional pusher elements between the article and the preceding article, or c) the article should be assigned pusher elements that will be upstream from the preceding article with at least one additional pusher element located between the article and the preceding article.

14. The method as recited in claim 13, further comprising placing the article and the preceding article on a sortation conveyor along opposing sides of the sortation conveyor based upon the determination such that the articles either laterally overlap, are longitudinally adjacent with minimal gap, or are longitudinally spaced based upon the determination.

* * * * *